United States Patent
Gaither et al.

(10) Patent No.: US 8,972,969 B2
(45) Date of Patent: Mar. 3, 2015

(54) OUT OF BAND SERVICES UPDATES

(75) Inventors: Shawn A. Gaither, Raleigh, NC (US); Randy L. Swineford, Sunnyvale, CA (US)

(73) Assignee: Adobe Systems Incorporated, San Jose, CA (US)

(*) Notice: Subject to any disclaimer, the term of this patent is extended or adjusted under 35 U.S.C. 154(b) by 302 days.

(21) Appl. No.: 13/492,651

(22) Filed: Jun. 8, 2012

(65) Prior Publication Data
US 2013/0332917 A1 Dec. 12, 2013

(51) Int. Cl.
*G06F 9/44* (2006.01)

(52) U.S. Cl.
USPC .......................................................... 717/170

(58) Field of Classification Search
CPC .......................................................... G06F 9/44
USPC .......................................................... 717/170
See application file for complete search history.

(56) References Cited

U.S. PATENT DOCUMENTS

| | | | |
|---|---|---|---|
| 7,051,097 B1 * | 5/2006 | Pecina | 709/224 |
| 8,316,363 B2 * | 11/2012 | Hocker et al. | 717/168 |
| 2006/0095830 A1 * | 5/2006 | Krishna et al. | 715/500 |
| 2011/0022827 A1 * | 1/2011 | Plache et al. | 713/1 |
| 2011/0126134 A1 | 5/2011 | Macken | |
| 2011/0126213 A1 | 5/2011 | Macken | |
| 2011/0161949 A1 | 6/2011 | Kodaka | |
| 2011/0321023 A1 * | 12/2011 | Hocker et al. | 717/168 |
| 2012/0084552 A1 * | 4/2012 | Sakthikumar et al. | 713/100 |
| 2013/0024862 A1 * | 1/2013 | Lim et al. | 718/1 |
| 2013/0179872 A1 * | 7/2013 | Kuzmack et al. | 717/173 |
| 2013/0198347 A1 * | 8/2013 | McKinstry et al. | 709/220 |
| 2013/0198764 A1 * | 8/2013 | Kacin et al. | 719/328 |
| 2013/0305235 A1 * | 11/2013 | Nathan et al. | 717/169 |
| 2013/0318515 A1 * | 11/2013 | Bowen | 717/168 |
| 2014/0047428 A1 * | 2/2014 | Prakash et al. | 717/168 |

* cited by examiner

*Primary Examiner* — John Chavis
(74) *Attorney, Agent, or Firm* — Wolfe-SBMC

(57) ABSTRACT

Out of band component updating may include receiving a data structure that includes information regarding a component of an application. It may further include determining, from the data structure, that an updated version of the component is available. Out of band component updating may also include storing the updated component in a local data store. It may additionally include, during execution of the application and without shutting down the application, updating the component with the stored updated version of the component. Updating the component may include loading the updated version of the component in a time that is substantially similar to that of a time to load a previous version of the component.

20 Claims, 15 Drawing Sheets

OUT OF BAND SERVICES UPDATES

BACKGROUND

Most software programs rely on a massive, platform-dependent update mechanism where the main application must be brought off-line for the update. For example, for typical software, the program is shut down, an update is installed, and the program is brought back up. Such a system can be disruptive to the user workflow thereby reducing productivity.

SUMMARY

Various embodiments of methods and apparatus for out of band component updating are disclosed. In one embodiment, out of band component updating may include receiving (e.g., by an update module executing in an application) a data structure that includes information regarding a component of an application. It may further include determining, from the data structure, that an updated version of the component is available. Out of band component updating may also include storing the updated component in a local data store. It may additionally include, during execution of the application and without shutting down the application, updating the component with the stored updated version. In various embodiments, the time to perform the update may be substantially similar to the time to read a previous version of the component. In some embodiments, the component may be platform-independent.

In one non-limiting embodiment, updating the component (e.g., a plug-in) may be performed in response to occurrence of an event relating to the component. For example, the event may be defined in the data structure as part of the information regarding the component.

Figure 1:
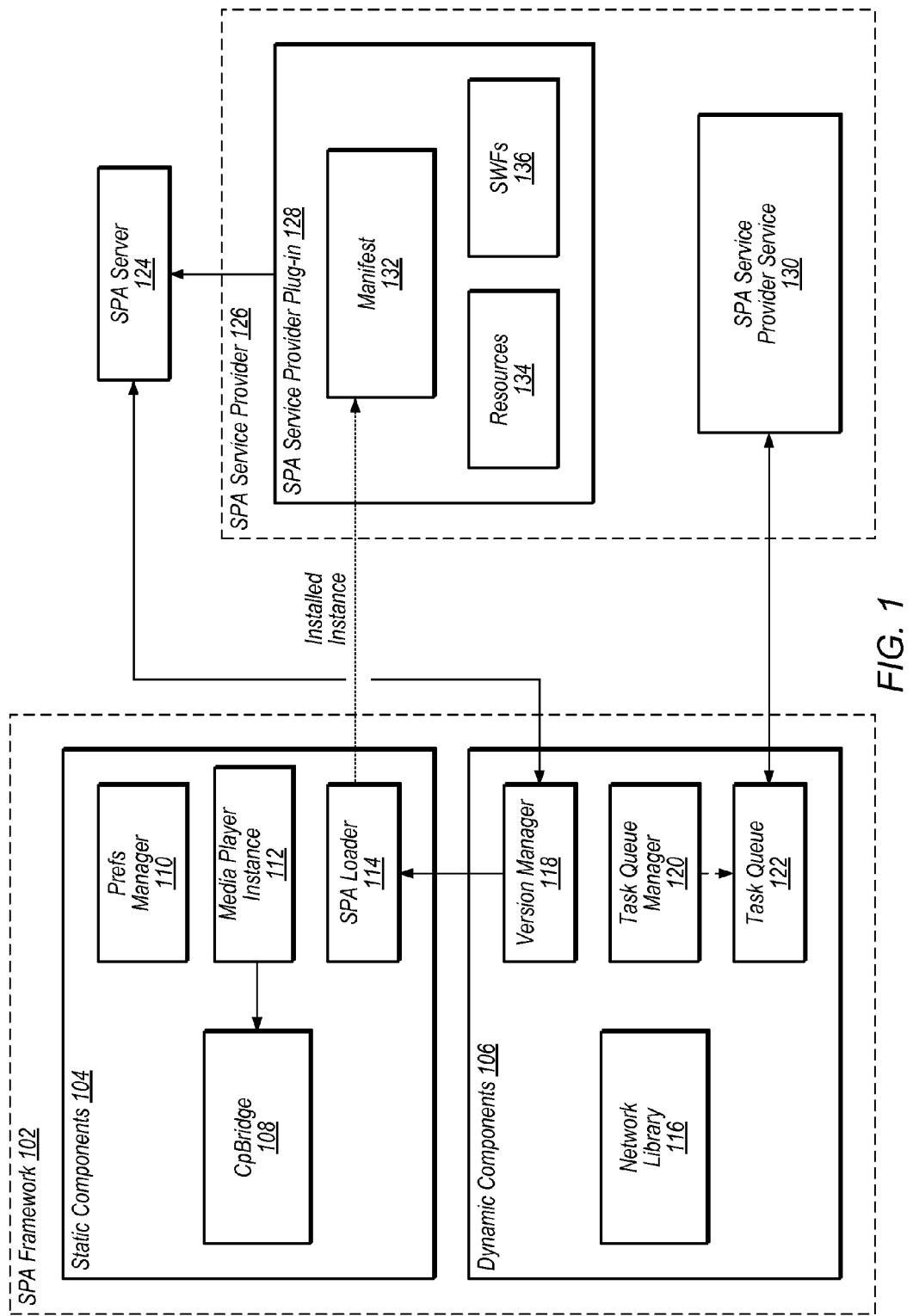
FIG. 1 illustrates a block diagram of an example services plug-in architecture (SPA) configured to implement the disclosed out of band update techniques, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 . U.S.C. §112. ,sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, the terms "first" and "second" components of an application can be used to refer to any two components. In other words, the "first" and "second" components are not limited to logical components 0 . and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for updating a component of an application during execution of the application without shutting down the application are described. Although many embodiments are described in terms of plug-ins that are at least partially implemented in Extensible Markup Language (XML) and ActionScript, note that the disclosed techniques may apply to other application components and/or scripting languages (e.g., JavaScript, HTML 5. , etc.) as well. Some embodiments may include a means for receiving a data structure that includes information regarding a component of an application, a means for determining, from the data structure, that an updated version of the component is available, a means for storing the updated version of the component in a local data store, and/or a means for updating the component with the stored, updated version of the component during execution of the application and without shutting down the application. For example, an update module, executing in an application, may receive a data structure that includes information regarding a component of an application, determine, from the data structure, that an updated version of the component is available, store the updated version of the component in a local data store, and/or update the component with the stored, updated version of the component during execution of the application and without shutting down the application, as described herein.

The update module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to implement the logic module configured to: receive a data structure that includes information regarding a component of an application, determine, from the data structure, that an updated version of the component is available, store the updated version of the component in a local data store, and update the component with the stored, updated version of the component during execution of the application and without shutting down the application, as described herein. Other embodiments of the application may be at least partially implemented by hardware circuitry and/or firmware stored, for example, in a non-volatile memory.

This specification first presents an example architecture that may implement the disclosed out of band update techniques. Following the example architecture, the specification proceeds to disclose example techniques for performing out of band updates. Various examples and applications are then disclosed.

Turning now to FIG. 1, a block diagram of an example services plug-in architecture (SPA) that may implement the disclosed out of band updates is illustrated. The illustrated architecture may allow for application components (e.g., plug-ins) that can access cloud-based services, ActionScript SWFs (or other scripting language files) for panels and/or calculations, and native UI elements. Such an application component may be a software module that extends/modifies/adds to the capabilities of an application. One type of application component may be a SPA plug-in. The illustrated embodiment of the SPA includes SPA framework 102, SPA server 124, and SPA service provider 126.

In one embodiment, SPA framework 102 may provide a user interface presence for cloud-based services to interact with the user and documents. In some embodiments, SPA framework 102 may be implemented within an application such that the application may provide the aforementioned user interface (UI) presence. In the illustrated embodiment, SPA framework 102 may include static components 104 and dynamic components 106. Static components may include bridge 108, preferences manager 110, media player instance 112, and SPA loader 114. Dynamic components 106 may include network library 116, version manager 118, task queue manager 120, and task queue 122. In some embodiments, static components may be updated when the whole application is updated whereas dynamic components may be updated according to the disclosed techniques. SPA Framework 102, SPA server 124, and/or SPA service provider 126 may be communicatively coupled (e.g., over an electronic communication network, such as the internet, a local area network (LAN), a cellular communications network, or the like) with one another. SPA Framework 102, SPA server 124, and/or SPA service provider 126 may located remotely from one another.

In some embodiments, SPA framework 102 may be implemented within an application. Static components 104 may reside within the executable portion of the application and may therefore load upon launching the application. CpBridge 108 may provide for action interfaces. For example, CpBridge 108 may provide access to native user interface components, access the application's document model, and may provide for on-demand use of a media player. CpBridge 108 may also include a factory class for custom panels for the application. Media player instance 112 may be an instance of a media player (e.g., Flash Player). The instance of the media player may provide for implementing a user interface (e.g., Flash UI) for a component (e.g., plug-in) of the application. Media player instance 112 and CpBridge 108 may be non-volatile. SPA loader 114 may be configured to download dynamic components 106 via version manager 118. Note that in some embodiments, SPA loader 114 may not be implemented in the executable portion of the application. Instead, SPA loader 114 may be implemented in a platform-independent manner and may be part of dynamic components 106.

Dynamic components 106 may reside, for example, in an on-demand dynamic link library (DLL). Modification to dynamic components may occur via server push or in some other manner. In one embodiment, the lifetime of a dynamic component begins after startup of the application. Network library 116 may provide various network communication protocols for the SPA. Network library 116 may provide authentication and authorization, identification and version control, and other functions, such as usage billing and monetization. Network library 116 may ensure secure communication with service provider servers. In one embodiment, network library 116 may include an ActionScript Services Object (Services.as) that may act as an interface to the functionality of the application. This library may seamlessly support functionality including access to SPA plug-in data (e.g., preferences, localized strings), access to SPA action events, a data model for the document, and interaction with the application environment (e.g., logging, progress bars). Action events may also be used to interact with other plug-ins. Version manager 118 may be configured to communicate with various servers (e.g., SPA server 124) to check for updates to application components (e.g., plug-ins). Task queue 122 and task queue manager 120 may be configured to handle asynchronous tasks (e.g., downloading updated versions of components), as described herein.

SPA server 124 (e.g., Akamai server/multiple servers) may implement various extensible network communication protocols to allow for authentication, authorization, identification, version controls, usage billing, and monetization. Usage billing and monetization context may include forwarding such requests and confirmations on to another separate server as well. SPA server 124 may be configured to provide SPA plug-ins, including various versions of those plug-ins, to SPA framework 102 for updating the plug-ins.

In the illustrated embodiment, SPA service provider 126 may include SPA service provider plug-in 128 and SPA service provider server 130. SPA service provider plug-in 128 may include manifest 132, resources 134, and SWF 136. In some embodiments, the services plug-in architecture may support service interactions within the context of an application. Service plug-ins (or other components of an application) may be discoverable and updatable on-demand without updating the application. In one embodiment, the plug-ins may be written in ActionScript (or similar language) such that the plug-ins are platform-independent.

SPA service provider 126 may include SPA service provider plug-in 128 and SPA service provider service 130. Although FIG. 1 illustrates SPA service provider plug-in 128 as part of SPA service provider 126, it is noted that, although a plug-in may originate outside of SPA framework 102, one more plug-ins may be stored locally in one of the SPA plug-ins folder locations (e.g., in the install directory for standard installation or in the user directory for out-of-band installation or remotely) on the computing system executing SPA framework 102. The SPA framework and application may access the plug-ins from that local data store (e.g., user-specific local data store) to present various UI content (e.g., panes, selectable elements, content etc.). In other embodiments, one or more SPA plug-ins may be located remotely from SPA framework 102 and accessible over a network.

Although much of the description herein refers to updating components/plug-ins for which a version is already present for use in the application, similar techniques apply for adding new components and new functionality to an application.

The plug-in contents may include an XML-based description of UI elements and their bindings to methods (e.g., ActionScript), native resources (e.g., strings, icons, data), and the files (e.g., SWF) implementing the plug-in user interface (e.g., Flash UI). The SPA plug-in may also contain a digital signature.xml file for certification. In one embodiment, a SPA plug-in may be a signed universal container format (UCF) file that contains an XML configuration file, one or more locales files, icon resource files, and one or more SWF (or comparable) interface components. The locales files of a SPA plug-in may be separate from the UCF and may reside in locales folders. Various elements residing in the root-level element may be incorporated directly in an interface definition specification (IDS) or a separate file. The ids.xml file may include UI objects (e.g., top bar buttons, menu items, right-hand panel items, etc.) for the application, action descriptors, and various preferences. The IDS may also reference SWFs, local files, and data resources (e.g., icons) that are contained within the UCF. In some embodiments, a separate file (e.g., locales.xml, resources.xml) may be used to minimize parsing for on-demand performance, although embedded files may also be used.

One type of SPA plug-in that may be part of the actual application may be referred as a configuration file/component/plug-in (e.g., services.cfg). The SPA configuration file may be a signed UCF file located in one of the SPA plug-ins folder locations (e.g., in the install directory for standard installation or in the user directory for out-of-band installation). It may be primarily an XML file that contains configuration information about the framework, top-level UI (e.g., top bar buttons, names of right hand panes, advertisement item references, etc.) as well as other parameters (e.g., a white list of available JavaScript functionality, third-party access, a list of valid certificates, etc.). Such information and parameterization may be global to all SPA plug-ins. The configuration file's IDS may contain several different elements in its root-level element. As with the IDS of a plug-in, the child elements may reside in separate XML files to aid in the clarity of the topology and/or improve on-demand performance. Various configurable parameters of the SPA framework may include capabilities for third-party SPA plug-ins, out-of-band installs, top bar button and advertisement item references, SPA right-hand panes, white lists for JavaScript, and commonly used certificates.

Manifest 132 may be a data structure that includes information regarding one or more components (e.g., plug-ins) of an application. It may include a description of the SPA plug-in components and interfaces. Manifest 132 may also be referred to as an IDS. Manifest 132 may include native UI usage declarations, network domain declarations (e.g., for security), and scripting language (e.g., ActionScript) method entry points. In one embodiment, the IDS may be an XML file. Information regarding one or more components of an application may include location (e.g., relative or absolute), version number, size, trigger/event, whether auto-updating is permitted, etc., as described herein. An example manifest schema for available SPA plug-ins on a server is as follows:

```
namespace xsd="http://www.w3c.org/2001/XMLSchema-datatypes
default namespace pdf="http://ns.adobe.com/pdf/services/manifest/2011"
grammar {
start =
        element manifest {manifestContent}
manifestContent =
        attribute version {versionString} &
        attribute release {versionString} ? &
        attribute group {uidString} ? &
        attribute updateRate xsd:positiveInteger ? &
        attribute updateWait xsd:positiveInteger ? &
        element config {configContent} *
        element plugin {pluginContent} *
pluginContent =
        attribute id {uidString} &
        attribute group {uidString} ? &
        attribute requires {versionString} ? &
        { configContent }
configContent =
        attribute version {versionString} &
        attribute release {versionString} ? &
        element download {downloadContent} &
        element install {installContent} ? &
        element locale {localeContent} *
uidString =
        xsd:token {pattern="[a-zA-Z0-9_\.]*"}
nameString =
        xsd:token {pattern=[a-zA-Z0-9__]*"}
versionString =
        xsd:token {pattern="[0-9]+(\.[0-9]+){0-3}*"}
downloadContent =
        attribute protocol {xsd:token = "http" | "https"} ? &
        attribute uri xsd:anyURI
        attribute algorithm {xsd:token = "SHA1" | "SHA256" | "SHA512" | "RIPEMD160"} &
        attribute hash {xsd:token {pattern="[0-9a-fA-F]*"}} &
        attribute excludePromptInstall {xsd:token = "yes" | "no"} ?
installContent =
        attribute requiresPrompt {xsd:token = "yes" | "no"} ? &
        attribute promptPane {uidString} ? &
        attribute immediate {xsd:token = "yes" | "no"} ? &
        attribute priority {priorityContent} ?
priorityContent =
        xsd:token = "required" | "recommended" | "optional" | "testing"
localeContent =
        attribute language {langCode} &
        attribute prompt xsd:text &
        attribute note xsd:text ?
langCode =
        xsd:token =   "en-US" | "fr-FR" | "de-DE" | "ja-JP" | "zh-CN" | "zh-TW" |
                      "ko-KR" | "nl-NL" | "sv-SE" | "it-IT" | "es-ES" | "pt-BR" |
                      "nb-NO" | "fi-FI" | "da-DK" |"cs-CZ" | "hu-HU" | "tr-TR" |
                      "ru-RU" | "pl-PL" | "hr-HR" | "ro-RO" | "sk-SK" |"sl-SI" |
                      "uk-UA" | "ca-ES" | "eu-ES" | "ar-AE" | "el-GR" | "he-IL"
```

The version attribute of the manifest schema may be the version of the schema itself, whereas the release attribute may describe the version of the application needed to interpret the schema. The updateRate may be used to override the time in days between checking for updates, while the updateWait is the delay time after application initialization. Once the manifest is checked, the rate of updates for SPA plug-ins may be set to that of the manifest until the described rate changes upon subsequent updates. An option group can be specified to indicate the default group for the plug-ins listed in the manifest.

Regarding the manifest plug-in element, identifying attributes of the plug-in include its unique identifier, group identifier, version, the configuration version it requires, and the release version of the application that is required. Note that if the group identifier is specified in the manifest element, it may not also be in the plug-in element unless it is used to override the group of the manifest. The release attributes may represent the initial release for the update (subsequent releases may also be allowed but subsequent releases may have that plug-in version incorporated already or possibly may have a future version of the plug-in).

The uri attributes may specify a valid location where the plug-in is located on a server. A hash algorithm and value may be included that correspond to the data at the URI. There may be several install attributes for use on a per plug-in basis as well. These may include requiresPrompt to override user settings (in an auto load update mode); if applicable, on which pane (if any) to display the prompt (promptPane); and whether an immediate load/install is desired (which may alter the UI instantaneously or near instantaneously). There may also be the capability to exclude downloads if the user has an ask preference for install (excludePromptInstall).

The priority attribute may describe the criticality for the update. It may be used by the UI in suggesting an update to the user. Examples values for the priority attribute may include required, recommended, optional, and testing, among others.

The locales element may include one or more locale elements that contain a language attribute (e.g., that follows the RFC 3066 . language code, such as lang=en-US", as well as a localized prompt and optional note. Language attribute values may be normalized so that the capitalization of characters is not important. Underscore and dash may be used interchangeably in some embodiments. The two reason fields (note and prompt) may exist for different situations. The prompt may be used to display one or more reasons for updates when the user is prompted as to whether the update is desired. The prompt may be an HTML string that may be used as the main body of a popup (e.g., Flash popup). A note, however, may be used in the case where the SPA provides a notification that an automatic load has occurred. Due to its usage context, the note value string may not be an HTML string.

Figure 2:
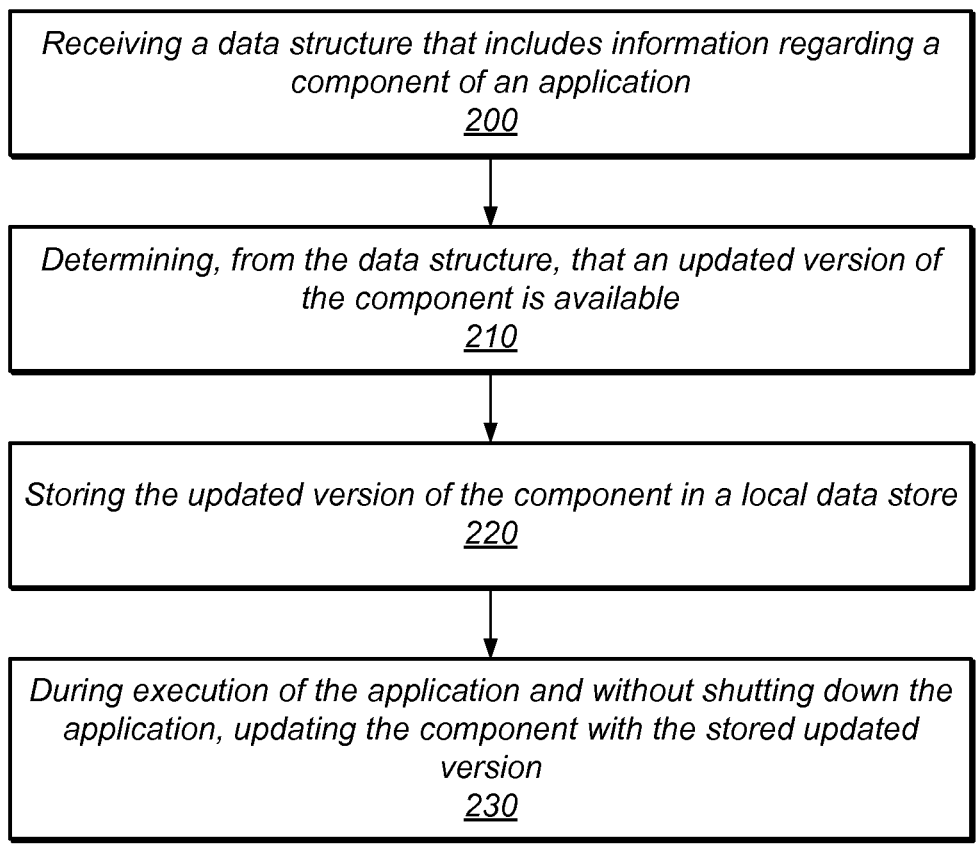
FIG. 2 is a flowchart of an example method for updating a component of an application during execution of the application and without shutting down the application, according to some embodiments.

Turning now to FIG. 2, one embodiment of a method for updating a component of an application during execution of the application and without shutting down the application is illustrated. While the blocks are shown in a particular order for ease of understanding, other orders may be used. In some embodiments, the method of FIG. 2 may include additional (or fewer) blocks than shown. Blocks 200-230 may be performed automatically or may receive user input. In one embodiment, SPA loader 114 and/or various other modules of the SPA framework may implement the method of FIG. 2.

Figure 12A:
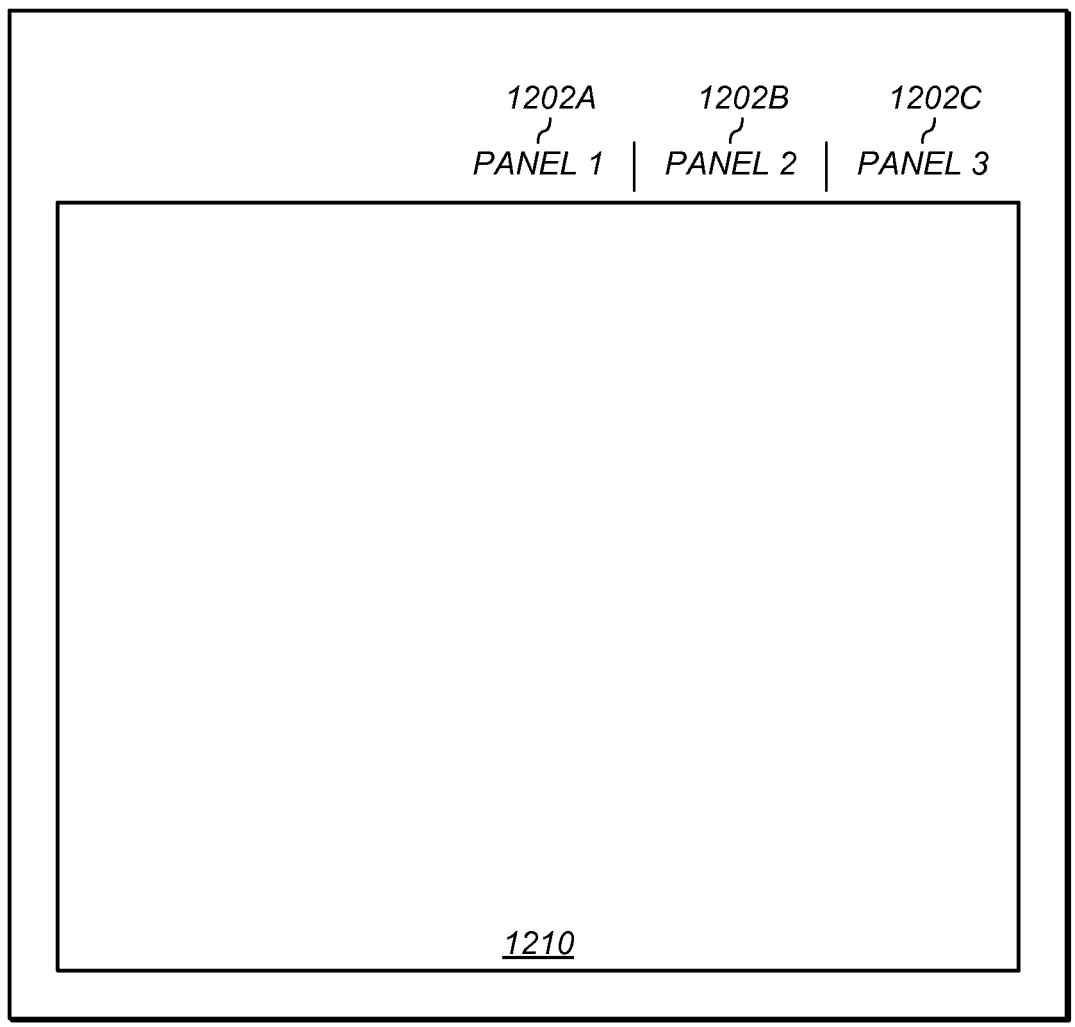
FIGS. 12A-12C illustrate panels in an example user interface, according to some embodiments.
Figure 12B:
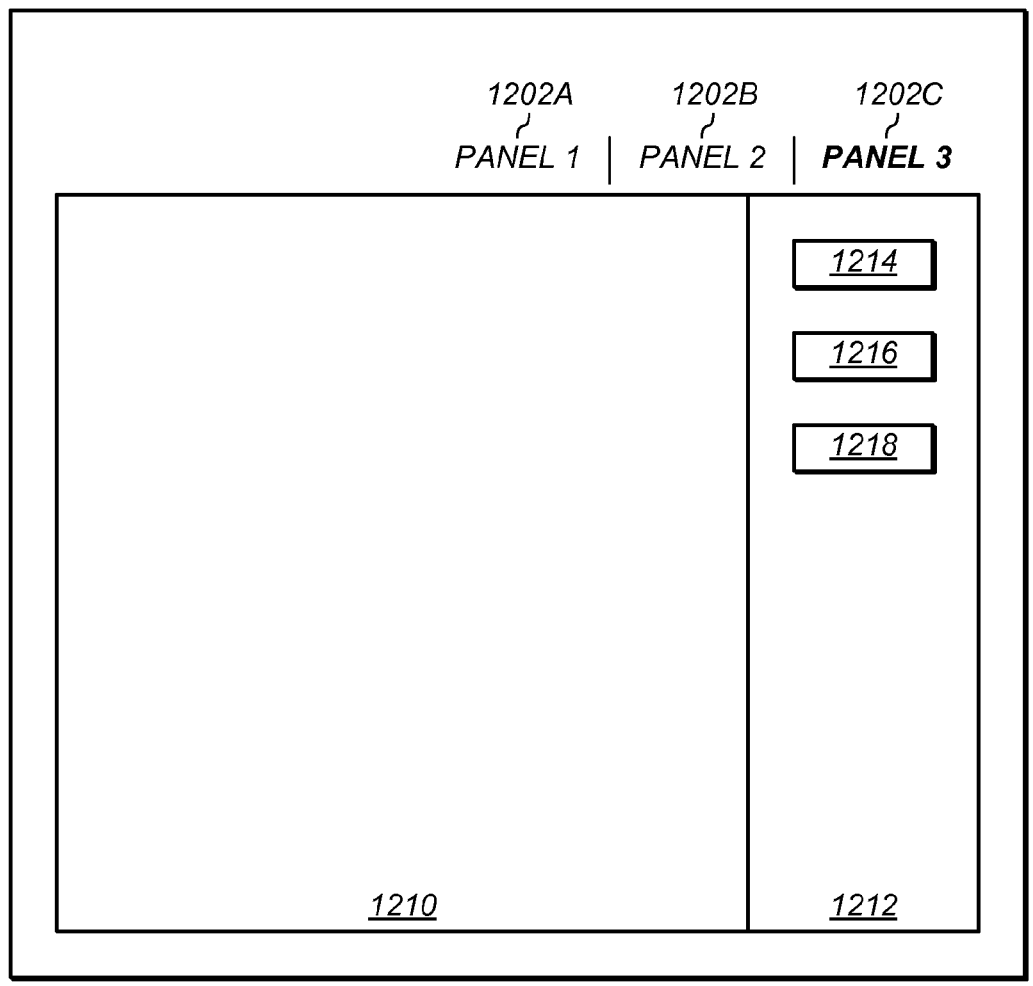

At 200, a data structure may be received that includes information regarding a component of an application. Receiving the data structure may be performed by an update module executing in an application. As one example, the update module may be SPA loader 114 executing in an application implementing the SPA framework. A component may be a plug-in (e.g., a SPA plug-in) or some other component that may add or modify functionality of the application. The plug-in may be implemented, at least partially, in a platform-independent scripting language, such as ActionScript, JavaScript, HTML5. , etc. In one embodiment, the component may include both an ActionScript component and an XML component. For example, referring to the example UI of FIGS. 12A-C, the selectable elements 1202A, 1202B, and 1202C (labeled Panel 1, Panel 2, and Panel 3, respectively) may be three different components. The graphics used to display labels Panel 1, Panel 2, and Panel 3 and the selectable element of those elements may be implemented in XML. If one of the selectable elements is selected, for example, selectable element 1202C for Panel 3, right-hand pane 1212 opens along with elements 1214, 1216, and 1218, as shown in FIG. 12B. Or, in the example shown in FIG. 12C, detached pane 1220 may open with elements 1214, 1216, and 1218. Right-hand pane 1212, detached pane 1220, and elements 1214, 1216, and 1218 may be implemented in ActionScript, or similar language, in some embodiments. Elements 1214, 1216, and 1218 may be text, graphics, other selectable elements, entry forms, etc. When right-hand pane 1212 is displayed, a viewable portion of the display area 1210 for other content reduces in size. When detached pane 1220 is displayed, detached pane 1220 covers a portion of display area 1210.

Referring back to FIG. 2, in various embodiments, one or more components may be platform independent such that the component is usable in a plurality of platforms (e.g., first and second platforms, such as OSX and Windows). The components may be implemented as described herein. In one embodiment, the components may not include glue code that would adapt the component to a specific single operating environment or platform.

In one embodiment, the application may be platform dependent whereas the update module and/or component may be platform independent. For example, one application may be specific to a first platform and a second similar application may be specific to a second application. The first and second applications may each include the same platform-independent update module that may implement at least some blocks of the method of FIG. 2. The first and second applications may each be configured to implement at least some of the same platform-independent components (e.g., plug-ins).

In one embodiment, the application may include an execution environment configured to implement the component. For example, the execution environment may be an ActionScript environment, JavaScript environment, HTML 5 environment, or comparable environment.

In some embodiments, the data structure may include a list of information regarding one or more components (e.g., SPA plug-ins) of an application. The information regarding the one or more components may include one or more of the location (e.g., absolute or relative), hash value, version number, and/or size.

In various embodiments, the data structure may be a signed XML list, such as the manifest described herein. In one embodiment, the data structure may be received from a secure file at a secure location of an operation system. For example, the secure location may be a registry or similar file/location.

As illustrated at 210, it may be determined, from the received data structure, that an updated version of the component is available. In some embodiments, the data structure (e.g., the manifest) may include information regarding one or more components (e.g., SPA plug-ins) of the application. For instance, the manifest may include information regarding the version number of the up-to-date version of a SPA plug-in. In some embodiments, determining whether an update is available may also include communicating with and checking for an update with an update server, which may be through various protocols (e.g., http, https). Determining whether an update is available may include communicating with and checking for an update with a local source. In various embodiments, multiple manifest locations may exist such that a manifest is received from multiple manifest locations. In such embodiments, the method of FIG. 2 may use the multiple manifests.

In one embodiment, determining that an update is available for the component may include determining which version of the SPA plug-in is currently loaded/installed/running/implemented. Determining which version of the SPA plug-in is currently loaded may include communicating with an installation microsafe, which may store information regarding the loaded version of the SPA plug-in. The information stored locally in the microsafe may be a local manifest that is compared with the received manifest. Information stored in the microsafe may include information on the one or more plug-ins, their respective hash value, mechanism, etc. The microsafe may, in some embodiments, be a self-hashed, tamper-proof file and may be located in a user specific directory.

Once the loaded version is known, determining that an update is available may include comparing the loaded version with the updated version of the SPA plug-in. If the updated version is different and/or more recent, then it may be determined that an update is available for that plug-in. At times, the current version may be the same version as the up-to-date version. At such times, it may not be determined at 210 that an update is available and the update module may return the framework to an idle loop as described herein. Additional details on determining whether an update is available are described at FIGS. 3-10.

In one embodiment, the update may be a single, secure, compressed file (e.g., a UCF file). The update may also be the entire updated component such that the update may be a UCF plug-in itself. When an update to a component exists, it may be downloaded asynchronously as described herein. The updated plug-in may be downloaded from an update server and may be stored in a local data store at 220.

Storing the update in a local data store may include storing the updated version to multiple different local data stores. For example, the update may be stored to a temporary data store and to a data store in a user area. After the update is stored to the temporary data store, the plug-in may be validated. For example, the updated plug-in may be read and interpreted to determine if the hash matches, to determine what the owner group the plug-in is in, and to determine any variances for the plug-in. After validation, the updated plug-in may be moved to the data store in the user area, where it may be ready to update/replace the currently loaded plug-in. Additional details on storing the updated version of the component are described at FIGS. 3-10.

As illustrated at 230, the component of the application may be updated with the stored update. The updating of the component may occur during execution of the application and without shutting down the application. In some embodiments, not only does the update happen without shutting down the application, but the update is substantially immediate without any perceptible experience by the user of the system (other than the user clicking a "use now" or similar button in the interface). By performing the download of the component prior to input from the user and substituting instantiation of the new component (UCF) as opposed to the old one, the plug-in is available for immediate use (e.g., no wait time). As described herein, the component of the application may be updated with the stored update by reading the stored update from its location rather than reading the previous version of the component from its location. The read time of the stored update and the previous version of the component may be substantially similar such that use of the updated version may not be perceptible to the user. As a simple example to illustrate this point, consider a user interface that prompts a user with "use now" and "cancel" buttons. By selecting "use now", the component of the application may be updated with the stored update. By selecting "cancel", the previous version of the component is used. The user may not experience any perceptible additional wait time to launch the component if "use now" is selected versus "cancel." In some embodiments, as described herein, updating the component may include reading, or loading, in the plug-in from a different location than the previous version of the component and modifying an entry in the Microsafe cache, which may be on the order of a microsecond. The bookkeeping for updating the UI cache may occur as a background task or it can be performed at shutdown. Any modification to the UI (e.g., modified menu items, added buttons, etc.) may be handled asynchronously.

In some embodiments, updating may be performed in response to an occurrence of an event relating to the component. The event may be defined in the data structure received at 200. For example, the information regarding the component may also include information regarding the event relating to the component. In some embodiments, the event may be an action associated with a UI item. For example, if the UI includes an envelope (e.g., to initiate sending an email), moving an icon representative of user input (e.g., mousing over) over the envelope and selecting it (e.g., clicking on it) may be an action. In the example of FIG. 12A, the action may be selecting one of the selectable elements 1202A, 1202B, and 1202C. In some embodiments, upon occurrence of the event/action, a prompt may be generated that an update to the component relating to the selected selectable element is available. The delayed loading of the update (e.g., waiting for the event) may give a user greater context regarding the update and may help inform the decision on whether to update the component. As noted herein, some updates can be loaded/installed immediately (e.g., if the immediate flag has been set). Input may be received to the prompt indicating to update the component. Or, input may be received declining to update the component. If the update is declined, the update may be automatically loaded the next time the application is launched or another prompt may be generated that the update is available the next time the application is launched. In one embodiment, the event may actually be the next instantiation of the application such that the new, updated plug-in will be the current plug-in (or a prompt will ask the user whether to update the component) the next time the application is launched.

In some embodiments, a user may configure the update module to perform automatic updates without a prompt. In such embodiments, the plug-in may be updated automatically without prompting the user on whether the plug-in should be updated. In some embodiments, some components may be updated automatically without a user configuring the application and without a prompt. For example, certain components may need to be updated quickly to avoid security vulnerabilities. A Boolean value may exist in the manifest corresponding to at least some of the plug-ins indicating whether an automatic update should occur. If the Boolean value is true, update may occur without a prompt and without referencing a user's preference to automatically update. Such an update may occur upon launching of the application or immediately (e.g., if the immediate flag has been set). If the Boolean value is false, the update may take place based on any input received to a prompt indicating that an update is available or by referencing a user's preference to automatically update.

In some embodiments, updating of components may be performed as an atomic update. For example, some components may have a dependency to another component (e.g., the configuration file or another plug-in). The manifest may include information that indicates which version of the configuration file and/or which version of the application a plug-in requires. Thus, an updated plug-in may not be function properly if it needs a different configuration file that is not installed or is not available. In such an example, update of the plug-in may be deferred until both the plug-in and the configuration file can be updated together. In one embodiment, download of the updated plug-in may still occur but the actual updating may be deferred until multiple components can be updated atomically. In some embodiments, updates to component(s) that have dependencies to other component(s) may be performed atomically whereas updates to component(s) without dependency on another component may be performed singly on a per plug-in basis. The manifest may include the information for the update module to determine which components may be updated without regard to other components and which should be updated atomically.

In one embodiment, updating the component may include running/loading the updated component from its location rather than the previous component from its location. Updating the component may be described as running or loading the updated component rather than installing the updated component as the update is nearly instantaneous, nearly invisible, and may take place on-the-fly. Accordingly, in some embodiments, no external installer may be used. Instead, the logic used to update a component may reside within the application itself.

The updated component may update one or more features of the component. For example, new menu items, right-hand panes/panels, and/or advertising via the main application screen may be displayed. As another example, various actions upon selecting a selectable element may be modified, added, or removed.

The techniques described herein may allow for on-demand updates of service plug-ins outside of the standard release cycle. Download of SPA components can ensure the latest capabilities for providers and allow for the earliest adoption by service providers. Moreover, by utilizing cross-platform (platform-independent) compilation, plug-in designers may not have to create separate platform-specific plug-ins that each includes respective platform-specific glue code. In one embodiment, the disclosed techniques may allow for component updating without actually updating the DLLs.

Figure 3:
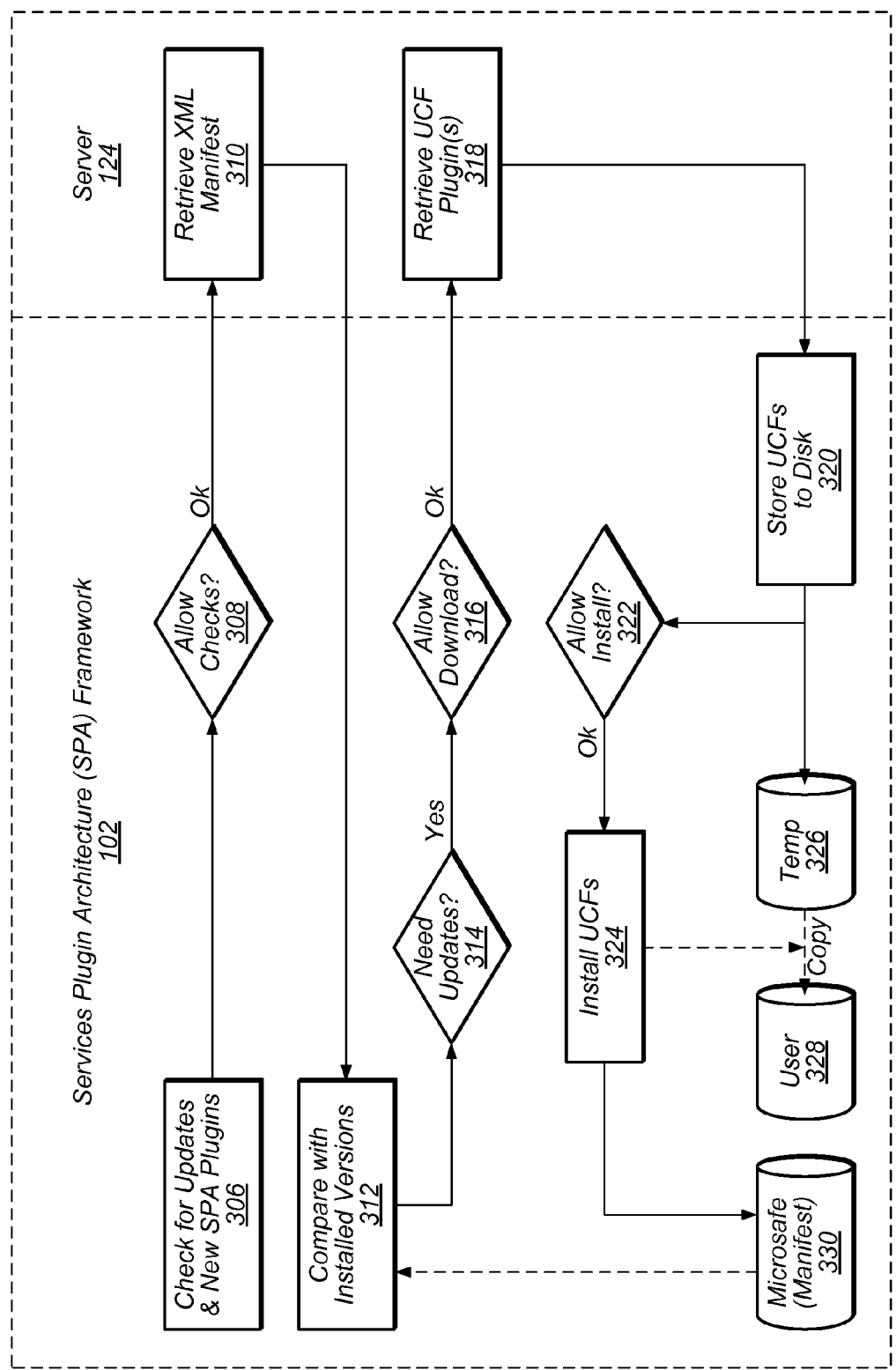
FIG. 3 illustrates example data flow between the SPA and a server to perform an update to a component of an application, according to some embodiments.

FIG. 3 illustrates example data flow between the SPA framework and a server to perform an update to a component of an application, according to some embodiments. While the blocks of FIG. 3 are shown in a particular order for ease of understanding, other orders may be used. In some embodiments, the data flow of FIG. 3 may include additional (or fewer) blocks than shown. The data flow of FIG. 3 may be performed automatically or may receive user input.

In one embodiment, SPA framework 102 may check for updates to existing plug-ins and for new plug-ins at 306. If checks are allowed at 308, the manifest (e.g., XML file) may be retrieved from server 124 at block 310. At 312, SPA framework 102 may compare the versions of various plug-ins in the manifest file to versions of the loaded plug-ins. Based on the comparison, it may be determined at 314 if any of the plug-ins needs to be updated. In some embodiments, if a plug-in is new in that it is not previously loaded, then it may be determined that it needs to be updated.

At 316, if the download of the plug-in is allowed, the one or more plug-ins for which an update is available may be retrieved at 318 from server 124. In one embodiment, each plug-in may be a single, compressed, secure file. As one example, a plug-in may be packaged as a universal container format (UCF) file. The retrieved plug-in(s) may be stored at 320 in a data store (e.g., temp 326) of SPA framework 102. At that point, the SPA plug-in may be certified/validated. Certification/validation of the SPA plug-in may include loading SPA plug-in UCFs and verifying the contents of those files via a signed certificate as well as a set of hashes that serve to verify the contents of each file within the UCF. This may ensure that no tampering is done with those files so as to prevent simple modifications to the files. Critical start-up data, as well as appropriate hash values may be cached in the PerUserCache area of the application to ensure minimal impact of the SPA framework on application startup time. If the loading of the updated plug-in(s) is allowed at 322, the plug-in(s) may be loaded at 324, which may include copying the plug-in to a local user 328 location. In some embodiments, the plug-in(s) may also or alternatively be loaded in a secure location, such as microsafe 330. The stored plug-in(s) in microsafe 330 may then be used at 312 the next time a manifest is compared with loaded versions of plug-ins.

Figure 4:
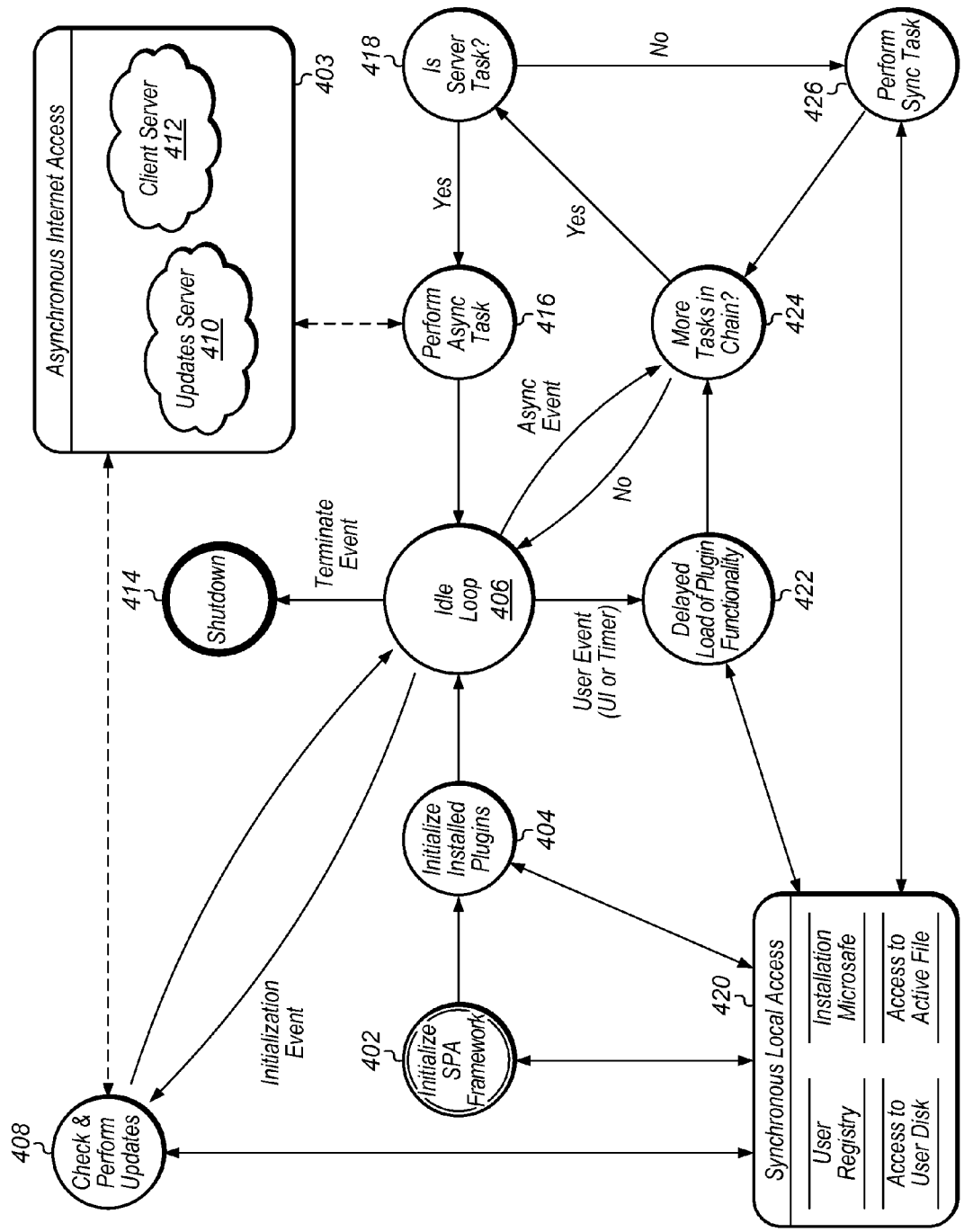
FIG. 4 illustrates example data flow for a SPA, according to some embodiments.

Turning now to FIG. 4, one embodiment of example data flow for a services plug-in architecture is shown. For simplicity of explanation, the description of FIG. 4 begins at 402 where the SPA framework is initialized. Initialization may be performed in response to launching an application or as part of finalizing an update. Initializing the SPA framework may include communicating with synchronous local access 420. Synchronous local access 420 may include a user registry (or comparable data structure), and an installation microsafe. Synchronous local access 420 may provide access to user storage and may provide access to an active file. For example, the active file may be a file that was selected and opened (e.g., double-clicked to open). Loaded plug-ins may then be initialized at 404. Initializing the loaded plug-ins may include displaying any graphics or artwork associated with a plug-in (e.g., menu items, icons, etc.). The SPA framework may then proceed to idle loop 406. Additional detail regarding initialization is shown and described at FIG. 9.

In some embodiments, upon launching the application or at some other time (e.g., periodic interval, based upon occurrence of an event), check and perform updates 408 may be performed. Checking updates may include communicating with updates server 410 and/or client server 412. Performing updates may include communicating with synchronous local access 420. For example, an update for a component may be stored in a microsafe, as described herein. Note that each check for an update may not necessarily be followed by performance of an update. For instance, an update may not be available such that after checking for an update, the framework may return to idle loop 406. After performing checking and/or performing updates at 408, the framework may return to idle loop 406. Checking and performing updates in the SPA framework is described in more detail at other Figures (e.g., FIGS. 3, 6-8, and 11).

In some embodiments, the SPA framework may support delayed load of plug-in functionality 422 such that the download and installation is asynchronous. Delayed load of plug-ins may be facilitated by having the static UI components separated from the rest of the plug-in via the PerUserCache. The PerUserCache may act to define all the UI components that need to be drawn at startup (e.g., top bar buttons, pane tabs, etc.). In some embodiments, menu items that are not top level menu items may also be part of the defined UI components that need to be drawn at startup, whereas in other embodiments, those menu items may not be included in that group. The PerUserCache may be built upon initial full load of the plug-in and from that point on, the cache may only be need at startup. The plug-in may be loaded (e.g., the XML parsed, execute an action, invoke Flash to draw the pane) when the user interacts with the UI, or upon occurrence of some other event that requires definition of the plug-in. This separation of the UI from the remainder of the plug-in further allows updates to be utilized immediately as loading the revision and loading the original plug-in is imperceptible to a user, except if any UI elements are modified or added as a result of the update (e.g., a changed top bar icon, an added menu item, etc.). Exceptions of any modified or additional UI elements as a result of the update may be handled asynchronously. Constructing a new PerUserCache may be handled asynchronously in the idle loop or at shutdown time.

As one example of the delayed plug-in functionality, updates to plug-ins may be downloaded after launching an application but the updates may not be loaded until input is received that indicates the updated plug-in is to be used. As a practical example, in one embodiment, a menu item may be implemented with a platform-independent plug-in. With a previous version of the plug-in, 3 . sub-menu items may be available for selection when the menu item is selected. In a delayed load situation, an updated version of the plug-in may be downloaded in a background task but may not be loaded until the menu item is selected. Once the menu item is selected, nearly instantaneously, updated sub-menu items (e.g., a different number of sub-menu items, changed sub-menu items, etc.) may be displayed in response to selection of the menu. In such an example, the update of the plug-in may be based on occurrence of an event (e.g., user event, user input, display of certain content). Other examples of an event may be a timer event such that updating is performed upon expiration of a timer. In one embodiment, delayed updating may be based on a timer and/or an event such that the first occurring event may cause the update to occur. As shown in FIG. 4, updating the plug-in may include accessing synchronous local access 420, for instance, to access the stored, already downloaded plug-in from the installation microsafe.

The SPA framework may determine if more tasks are in the chain of tasks at 424. If not, the framework may return to idle loop 406. Note that block 424 may be reached directly from the idle loop upon occurrence or determination that an asynchronous event should occur. If there are additional tasks in the chain, it may be determined if the task is a server task at 418. If the task is a server task, an asynchronous server task may be performed at 416 including accessing updates server 410 and/or client server 412. After the server task is complete, the framework may return to idle loop 406. If the task is not a server task at 418, then a synchronous task may be performed at block 426 including accessing synchronous local access 420. After completing the synchronous task, it may be determined whether more tasks are in the chain at 424. Task performance in the SPA framework is described in more detail at FIG. 10.

The SPA framework may shutdown at 414 in response to a terminate event. For example, if the application is shutdown, the SPA framework may likewise be shutdown.

Figure 5:
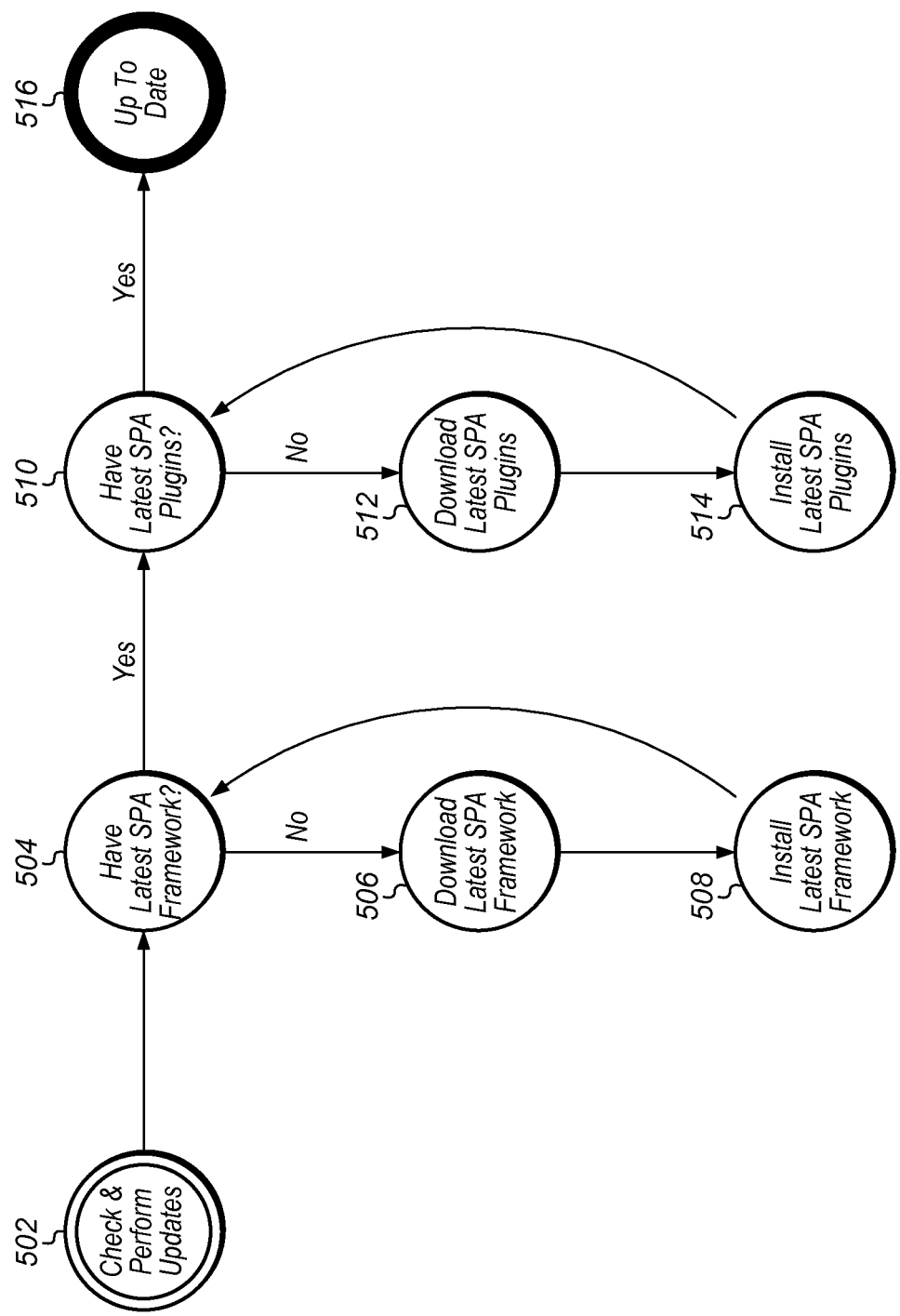
FIG. 5 illustrates example data flow for checking for and performing updates to a component of an application, according to some embodiments.

Turning now to FIG. 5, one embodiment of example data flow for checking for and performing updates to a component (e.g., plug-in) of an application is shown. Check and perform updates 502 may be the starting point for checking and updating of a plug-in. Note that the sequence of operations of FIG. 5 is not necessarily intended to illustrate each and every interaction with local disk or web servers. Additional details are provided in other Figures.

At 504, it may be determined if the latest SPA framework is installed. If not, then the latest SPA framework may be downloaded at 506 and installed at 508. A similar path exists for determining if the latest versions of one or more SPA plug-ins are loaded at 510. If not, the latest SPA plug-ins may be downloaded at 512 and loaded at 514. After performing the update checks and updating if necessary, the framework and/or plug-ins may be up to date at 516. Note that checking and performing updates for either the framework or the SPA plug-ins may be performed by itself without checking for updates for the other. For instance, in one embodiment, only blocks 510, 512, and 514 may be performed without performing blocks 504, 506, and 508.

Note that in some embodiments, the progression from one block to another in FIG. 5 may not be a mere progression from one block to the next sequentially. Instead, in such embodiments, a return to the idle loop of FIG. 4 or a progression to other intervening states may occur. Moreover, progression from one state to the next may depend on input received by the application. One example of such input may be input received to the application indicating that an available update to a plug-in should be applied.

Figure 6:
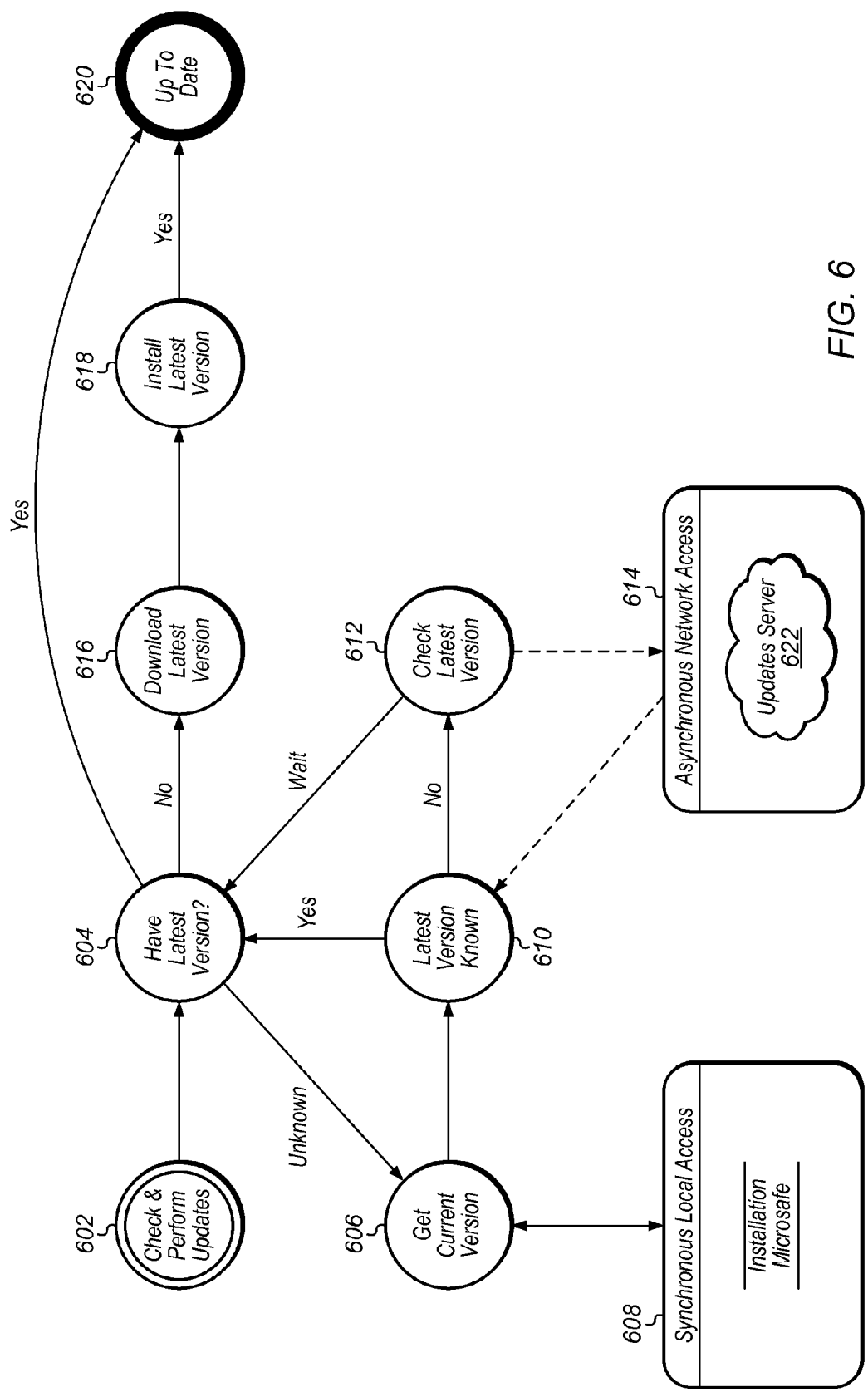
FIG. 6 illustrates example data flow for determining if a loaded component of an application is the latest version, according to some embodiments.
Figure 7:
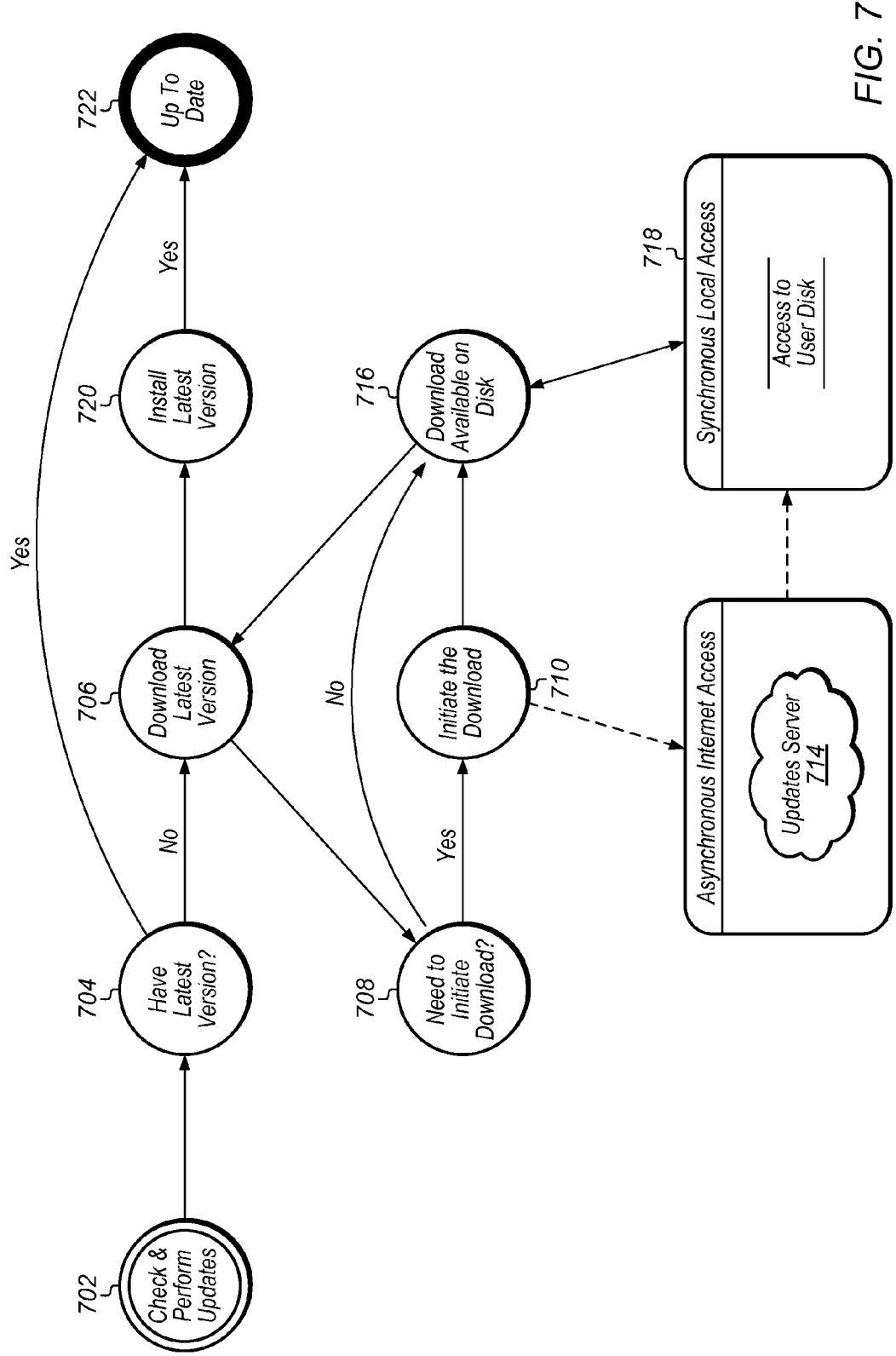
FIG. 7 illustrates example data flow for downloading the latest version of a component of an application, according to some embodiments.
Figure 8:
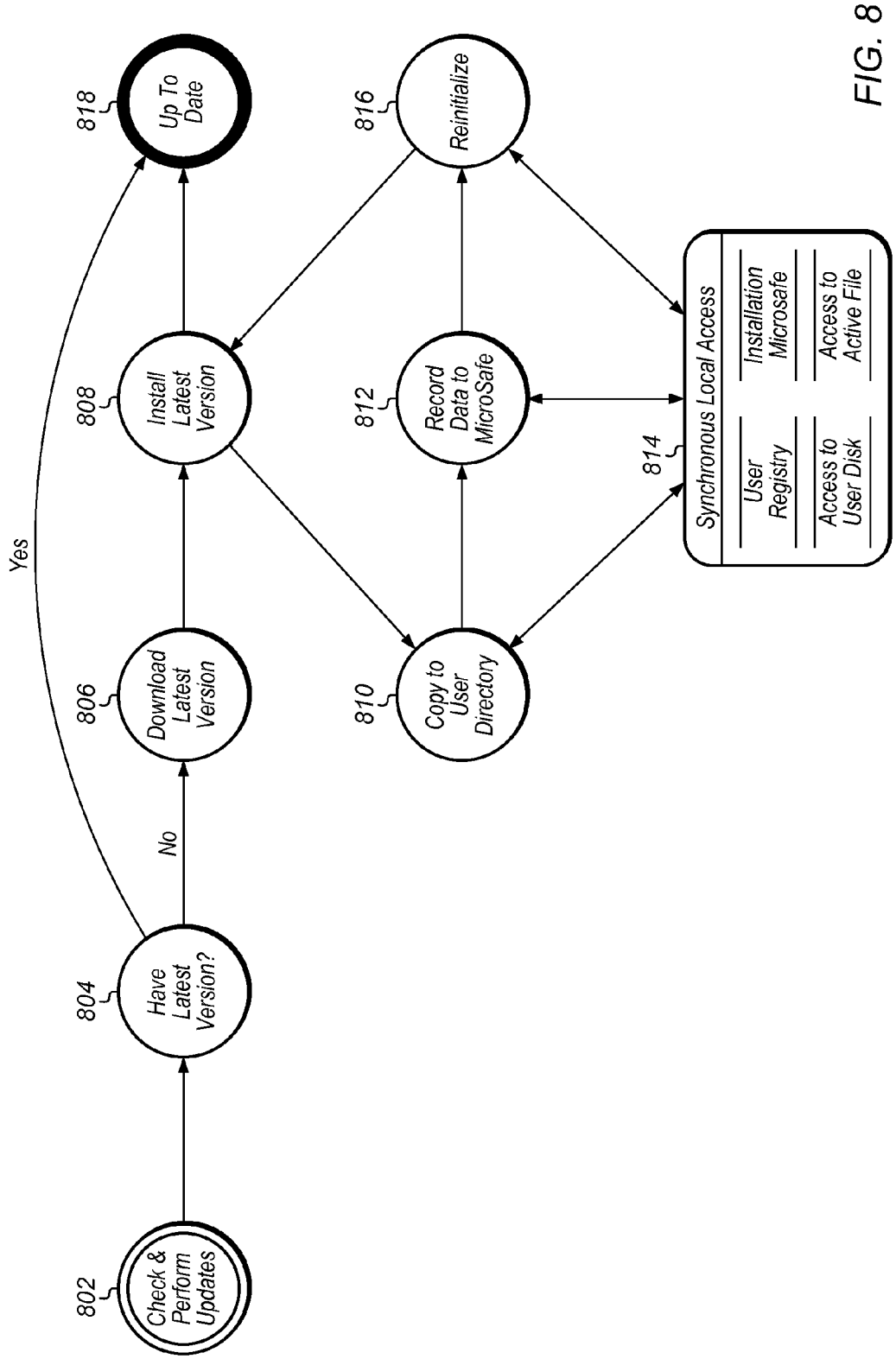
FIG. 8 illustrates example data flow for loading the latest version of a component of an application, according to some embodiments.

Note that the exploded sequences for determining whether an update is available, downloading the update, and loading the update as shown in FIGS. 6-8 may apply equally to updating the actual SPA framework and updating SPA plug-ins.

Turning now to FIG. 6, one embodiment of data flow for determining if the loaded component of an application is the latest version is shown. At 602, checking and performing updates may begin. At 604, it may be determined if the latest version (e.g., of the framework, of a plug-in, etc.) is loaded. If the currently loaded version is unknown, the current version may be determined at 606 by accessing the installation microsafe of synchronous local access 608. It may then be determined if the latest version is known at 610. If it is, then the process may return to 604 to determine if the latest version is already loaded. If it is unknown, then the latest version may be checked at 612, which may include accessing asynchronous network (e.g., internet) access 612 and updates server 622 to determine the latest version. After determining the latest version, the process may return to 604 via 610 as shown in FIG. 6. Note that the check for the latest version at 612 may be asynchronous. As a result, the process may include waiting for the information to be retrieved from updates server 622.

In one embodiment, determining whether the latest version is loaded at 604 may be a task that is scheduled and executed periodically via the idle process loop of FIG. 4. If it is determined that the latest version is loaded at 604, then the plug-in (or framework) is up to date at 620 and may return to the idle loop of FIG. 4. If the latest version is not determined at 604, then the latest version may be downloaded and 616 and loaded at 618. Once loaded, the plug-in or framework is up to date and may return to the idle loop.

Turning now to FIG. 7, one embodiment of data flow for downloading the latest version of a component of an application is shown. States check and perform updates 702, have latest version 704, load latest version 720, and up to date 722 are substantially similar to the corresponding states of FIG. 6. Therefore, the description of those states will not be repeated.

In one embodiment, to download the latest version (of a plug-in, of the framework) at 706, it may be determined, at 708, if the download should be initiated. If the download does not need to be initiated, the download may already be available locally (e.g., stored locally on disk) at 716. If the download should be initiated, it may be initiated at 710, upon which asynchronous internet access may occur to access updates server 714 to download the update. The update may then be copied to local storage in a user's local storage space. The sequence may then return to 706 from where the download may be loaded at 720 and be up to date at 722, and return to the idle loop of FIG. 4. Note that downloading the latest version at 706 may be asynchronous and may include waiting for the information to be retrieved from updates server 714.

Turning now to FIG. 8, one embodiment of data flow for loading the latest version of a component of an application is shown. Check and perform updates 802, have latest version 804, download latest version 806, and up to date 818 are substantially similar to the corresponding states of FIGS. 6 and/or 7. Therefore, the description of those states will not be repeated.

In one embodiment, loading the latest version may include copying the data that includes the update (e.g., UCF file) to the user directory at 810, as shown by access to user disk at synchronous local access 814. Loading the latest version may also include recording data (e.g., the UCF file) to the microsafe at 812. The microsafe may likewise be part of synchronous local access 814. At 816, the plug-in or framework may be reinitialized to complete installation of the update. Various aspects of the initialization of the framework may be different than initialization of a plug-in. Details of the initialization are described at FIG. 9.

Figure 9:
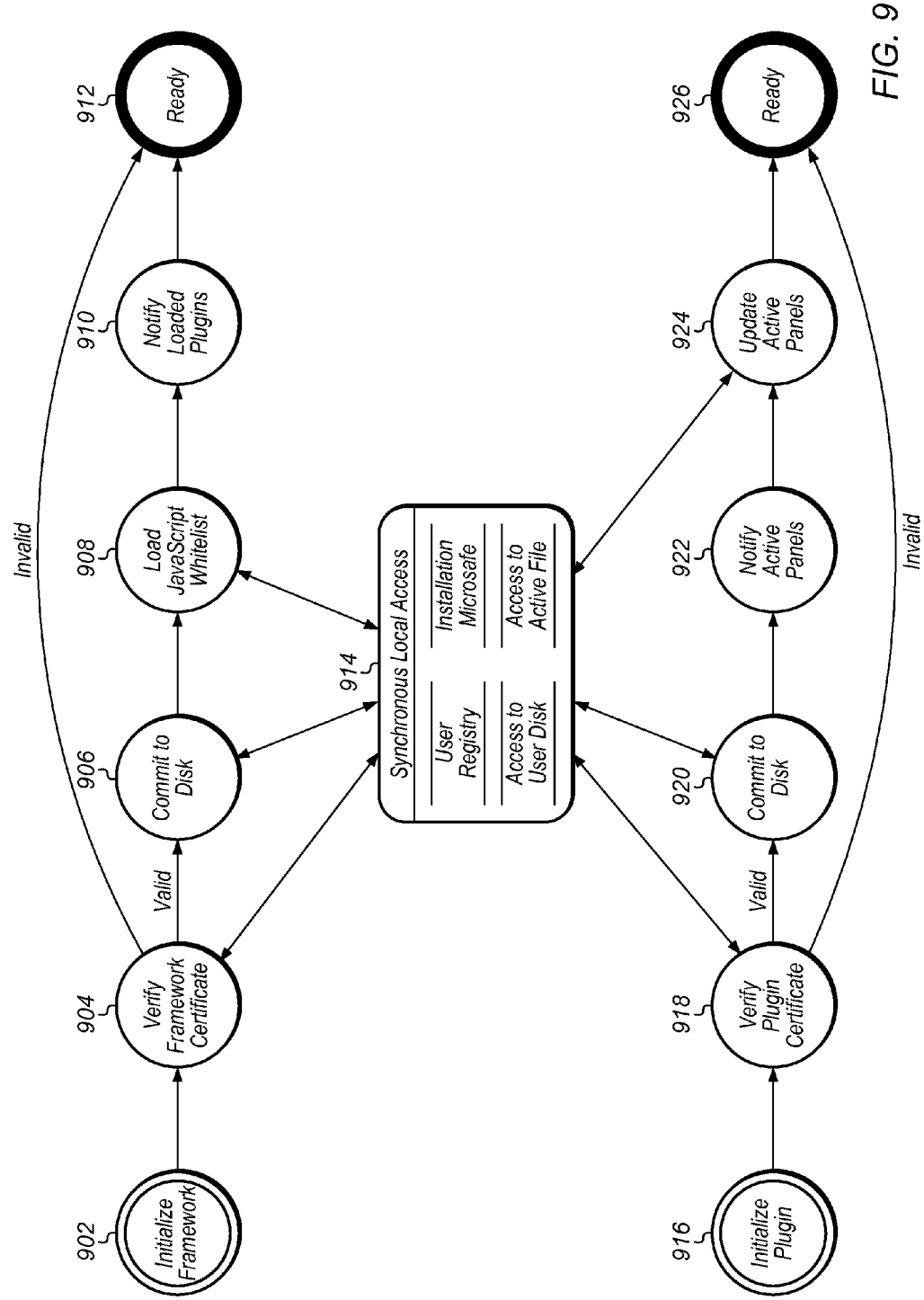
FIG. 9 illustrates an example initialization sequence, according to some embodiments.

Turning now to FIG. 9, one embodiment of an initialization sequence is shown. At 902, the SPA framework may be initialized and at 904, the certificate of the SPA framework may be verified. If the certificate is invalid, then initialization may be stopped and exited at 912. Verification, in one embodiment, may include accessing synchronous local access 914. If the certificate is valid, the sequence may continue to commit to disk 906 if the initialization is a new initialization. At 908, the JavaScript (or other scripting language) whitelist may be loaded. Loaded plug-ins may then be notified of the initialized framework at 910 and the sequence may be complete at 912.

Initializing plug-ins may begin at 916. At 918, similar to verifying the framework certificate, the plug-in certificate may be verified. Verification may include accessing synchronous local access 914. If the certificate is invalid, the initialization may be stopped and exited at 926. If the certificate is valid, commit to disk may take place. In some embodiments, commit to disk 906 and 920 may each occur for new initializations but not for re-initializations. At 922, active panels (e.g., that may be affected by an updated plug-in) may be notified of the initialization (and/or update). At 924, the active panels may be updated and at 926, the sequence may be complete. The system may then be returned to the idle loop of FIG. 4.

Figure 10:
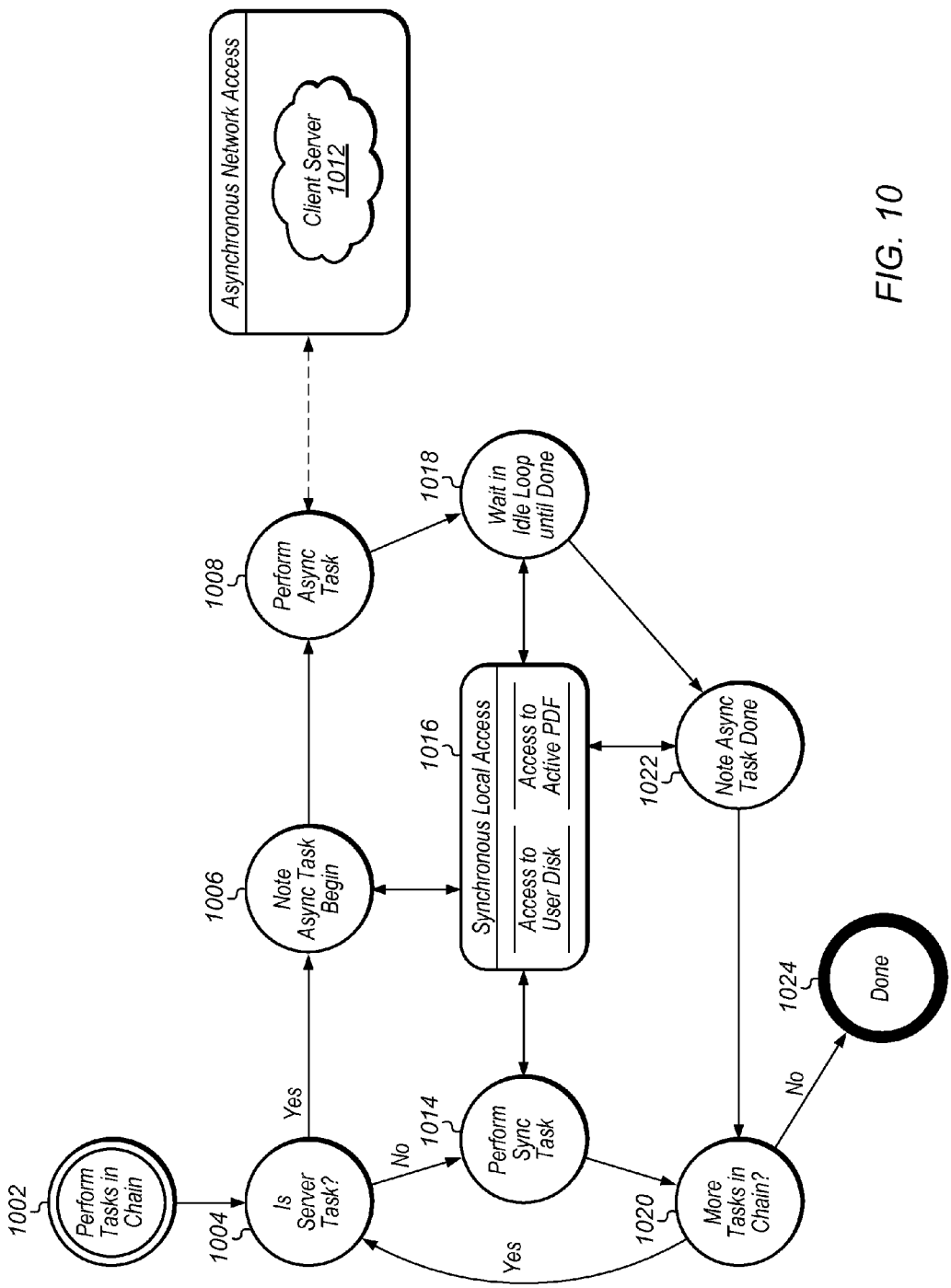
FIG. 10 illustrates example task data flow, according to some embodiments.

Turning now to FIG. 10, one embodiment of data flow for a task is shown. While the data flow is shown in a particular order for ease of understanding, other orders may be used. In some embodiments, the sequence shown in FIG. 10 may include additional (or fewer) states than shown. The data flow of FIG. 10 may begin at 1002 with one or more tasks of a chain that are to be performed. At 1004, it may be determined if the task is a server task. If not, then the task may be performed synchronously at 1014, which may include accessing synchronous local access 1016. After the synchronous task has been performed at 1014, it may be determined, at 1020, if there are additional tasks in the chain. If so, then the state may return to 1004 to determine if the additional task is a server task. If there are not additional tasks in the chain, the task data flow may end at 1024.

If, at 1004, it is determined that the task is a server task, then the task is asynchronous and it may begin at 1006, which may include accessing synchronous local access 1016. The asynchronous task may be performed at 1008, which may include accessing client server 1012 via asynchronous network access. At 1018, the process may wait in the idle loop until complete. At 1022, it may be noted that the asynchronous task is complete and it may be determined if additional tasks are in the chain at 1020. Note that after an asynchronous task is scheduled, processing may include immediately returning back to the idle loop. An idle processing event may be scheduled for periodic checking. Upon completion of the task, the idle check may be removed and the processing may continue as before.

Figure 11:
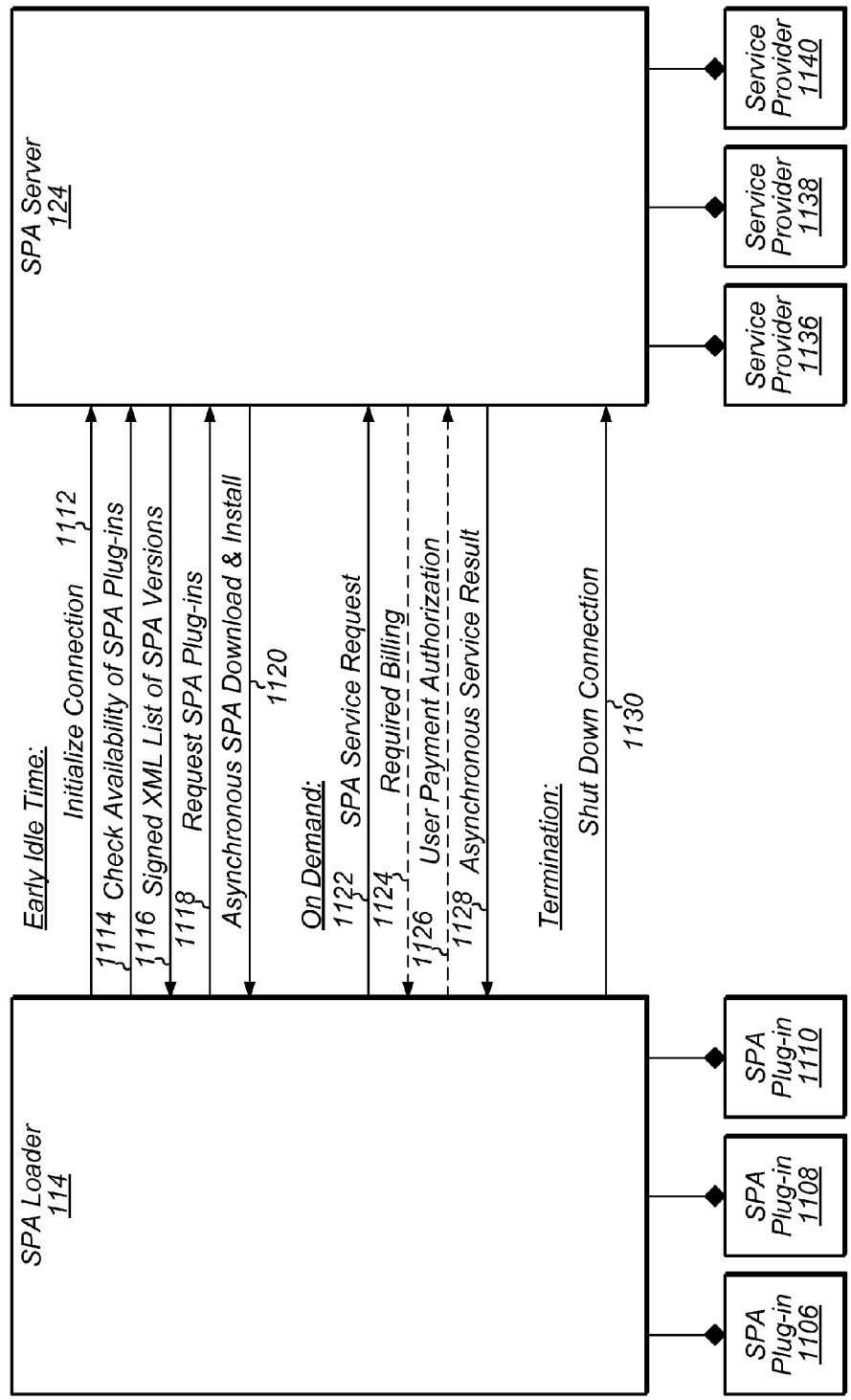
FIG. 11 illustrates a diagram of example calls between the SPA framework and server, according to at least some embodiments.

FIG. 11 illustrates an example diagram of calls between the SPA framework and server, according to some embodiments. As shown, SPA loader 114 may be configured to communicate with SPA server 124. In some embodiments, SPA loader 114 may be part of a SPA framework of an application (e.g., Acrobat). In some embodiments, SPA server 124 may exist in the cloud. SPA server 124 may store and/or provide information to providers (e.g., service providers 1136, 1138, and/or 1140), such as identification information, credentials, and/or available plug-ins. SPA server 124 may store and provide SPA plug-in data including identification, certification, version information, and/or billing information. SPA server 124 may also include/provide billing models that implement various payment methods and authorization certificates.

Several distinct phases of SPA server communication may exist. One phase may be an initialization of known SPA plug-ins (e.g., SPA plug-ins 1106, 1108, and/or 1110). Initialization may include parsing a cached IDS/manifest, registering menu/panel items, and/or binding function entry points. In one embodiment, an instance of SPA loader 114 may be created upon launching the application executing SPA loader 114. SPA loader 114 may check its plug-in folder for plug-ins (e.g., a pre-populated list may be made available). SPA loader 114 may open a file (e.g., universal container format (UCF) file) and extract resources based on the IDS (e.g., manifest). A UCF file may be similar to a zip file and may collect a directory structure into a single-file container. The UCF may support inclusion of signatures and certificates to ensure safe data transport of UCFs. SPA loader 114 may create UI items (e.g., menu items, toolbars, etc.) that are specified by the IDS. SPA loader 114 may also create a binding table for all the method entry points and web services.

In one embodiment, initialization may create a user interface with a minimal impact on startup time. The SPA reads may read in information from a secure cache for UI initialization. The information stored in the secure cache may include information to create global UI elements such as top bar icons and any right-hand panes. Panes may be named using a hierarchical convention in some embodiments. Note that although the term right-hand panes is used herein, other panes, such as left-hand panes, top panes, bottom panes, etc., may be used. This may also include detached panes, which may be referred to as pop-ups. The pop-up(s) may communicate directly with the parent pane, which allows the pop-ups to be suitable as dialogs. Further, multiple pop-ups may be supported per pane, which may allow them to be suitable for palettes, or detachable panes, for the main pane. The pop-ups can be recursive (e.g., a pane invokes a pop-up dialog, which in turn invokes another pop-up dialog). In some embodiments, to satisfy security concerns, pop-ups may not communicate with siblings and descendants thereof. Instead, the pop-ups may communicate with direct ascendants and descendants. Pop-up dialogs can also occur based on the main parent window and send appropriate actions to the main application, like other pop-up dialogs (e.g., if there is no parent SWF to send/receive communication messages). A pop-up may be invisible so that it can act as a communication bridge between child pop-ups. An invisible pop-up off the main application could communicate with all panes and therefore act as a monitoring station.

Another phase may be referred to as early idle time, which may be asynchronous. During early idle time, SPA loader 114 may check for updates to the dynamic components of the SPA framework and may also check for updates to any SPA plug-ins. During early idle time, SPA loader 114 may initialize the server connection 1112 with SPA server 124. At 1114, SPA loader 114 may check SPA plug-in availability by communicating with SPA server 124. Note that in other embodiments, upon initiating the connection at 1112, SPA server 124 may automatically send a list of SPA versions (e.g., in a manifest/IDS) without the request at 1114. In various embodiments, at 1116, SPA server 124 may send the list of SPA versions to SPA loader 114. In one embodiment, the list/manifest may be a signed XML list of SPA plug-in versions. In response to receiving the manifest, SPA loader 114 may determine whether the list of SPA plug-in versions includes any updates to currently loaded SPA plug-ins or new SPA plug-ins. After such a determination, SPA loader 114 may request one or more SPA plug-ins at 1118. For example, SPA loader 114 may request plug-ins for which an updated version is available or that were not previously present. At 1120, SPA loader 114 may download and load the requested plug-ins asynchronously, in that the downloaded plug-in may not necessarily be loaded immediately after being downloaded. Note that in some instances, the install may be optional. One situation in which the load may not be optional is if the priority attribute, as described herein, is set to required. SPA loader 114 may then provide a list of the loaded plug-in instances in a local data store to update a local version of the manifest.

Figure 12C:
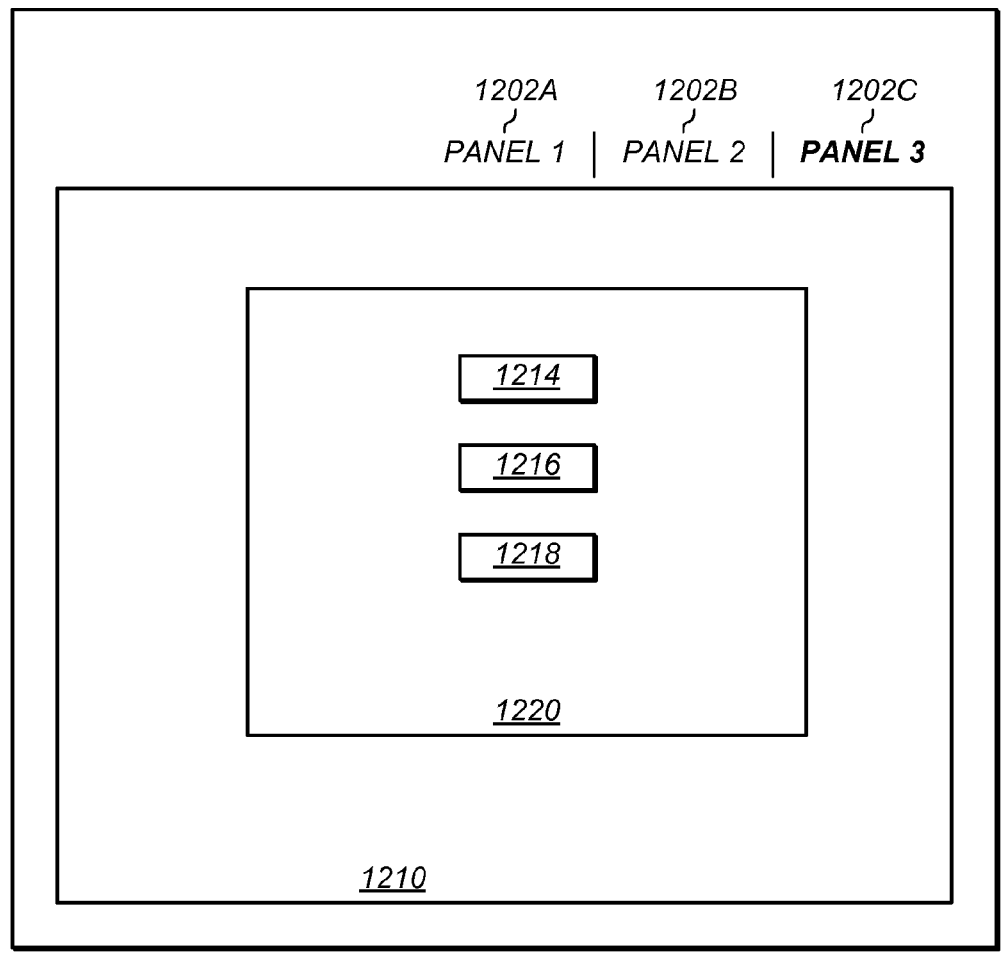

In some embodiments, another phase of SPA loader 114 to SPA server 124 communication may be referred to as on invocation of right-hand pane. During this phase, the IDS may be read and panels may be created. Note that the panels may be anywhere, such as a right hand pane shown in FIGS. 12A and 12B, a detached pane as shown in FIG. 12C, or they may be a left hand pane, bottom pane, etc. If enabled, the panels may be instantiated. Instantiation of one or more of the panels may be based on an event, such as receiving input indicating use of the panel (e.g., selecting a selectable element of the panel). An example is shown in FIGS. 12A-12C. Selection of panel 3 in FIG. 12A may cause instantiation of the panel labeled panel 3. FIGS. 12B and 12C reflect such an instantiation of the panel labeled panel 3 based on the selection (shown as right-hand pane 1212 in FIG. 12B and detached pane 1220 in FIG. 12C).

Referring back to FIG. 11, in various embodiments, another phase of SPA loader 114 to SPA server 124 communication may be referred to as on demand, or on UI trigger. In one embodiment, in response to an event, an SPA plug-in call may be triggered. As examples, events may include received user input (e.g., selecting a pane as shown in FIGS. 12A-C), timer events (e.g., a singular event at a specific time delay from program instantiation, or multiple (specific in number of infinite) repeating events based off an initial delay from program instantiation or a defined time/date. A media player (e.g., Flash Player) may be launched, if necessary, checking the binding table for the desired SWF (or other file type). The entry point may then be executed, as part of an asynchronous execution of each of the network methods. Any asynchronous tasks may be stored in the task queue (and global task queue manager). Also during the on demand phase, SPA loader 114 may perform a service request 1122, handle billing 1124, perform user payment authorization 1126, and receive asynchronous service results 1128. Note that billing and payment authorization may include communicating with a separate server whether performed as a request redirect or specifically addressing that separate server. During the on demand phase, it may be noted if the on demand access is local or cloud-based. Additionally, a chain of actions may be fulfilled during the on demand phase. In one embodiment, on demand may include creation of menu items, drawing right-hand panes and the panels contained within, and the execution of any existing UI elements created by the SPA. Other UI elements may include top bar buttons and pop-ups. In one embodiment, a SPA plug-in may be loaded on-the-fly to perform an action. At least some of the plug-in information may be stored in a microsafe cache to prevent re-evaluation of the UCF. For example, certificate data such as hash values may be stored in the microsafe cache. Plug-in locations may also be maintained for on-demand loading to prevent excess directory searches.

Yet another phase of SPA loader 114 to SPA server 124 communication may be a shutdown/termination phase in which SPA loader 114 may cancel and note any unfulfilled requests and/or disconnect 1130 from SPA server 124. In some embodiments, upon initiating the shutdown phase, the task queue manager may be queried to ensure that no task queues are still active. The application may present an option to wait to complete any remaining tasks or to cancel operations before shutdown. In one embodiment, the termination phase may unload plug-ins and release memory held by the SPA. When shutting down without waiting for asynchronous tasks to complete, the user has the option to store the remaining tasks for execution in the next instantiation when possible. This may be performed via a flag when instantiating that action.

Example System

Figure 13:
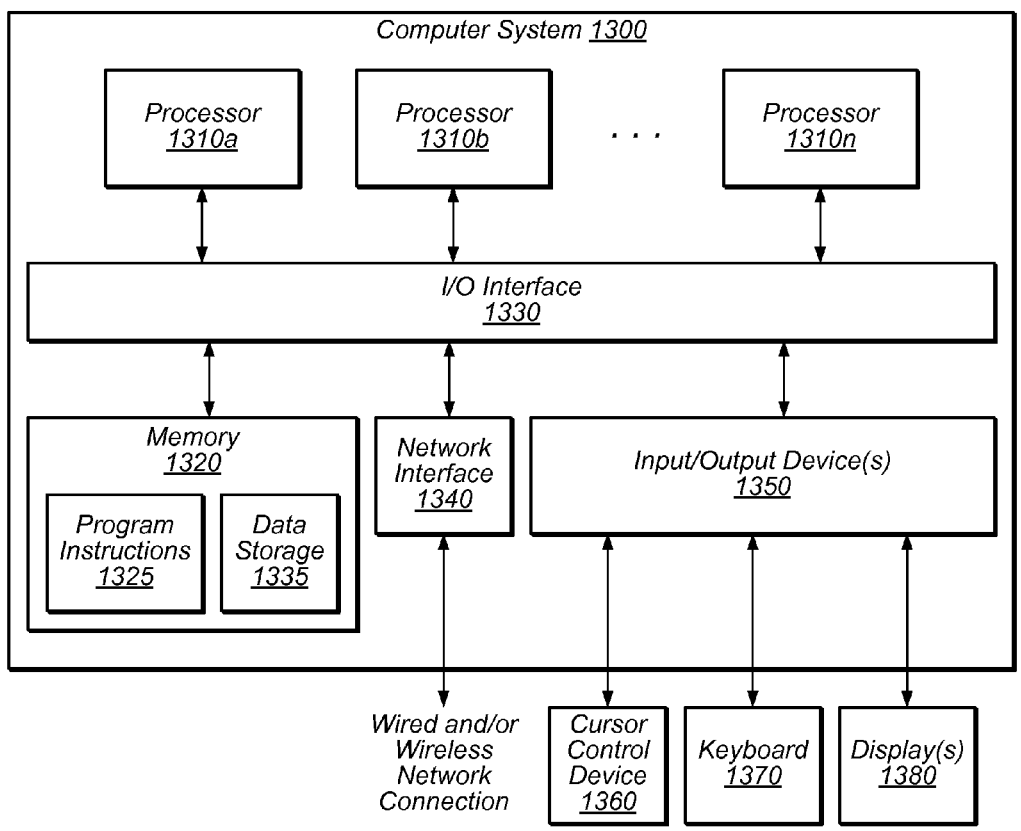
FIG. 13 illustrates an example computer system that may be used in embodiments.

Embodiments of the methods for out of band application component updating as described herein may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some embodiments, display(s) 1380 may be touch- or multitouch-enabled. In some embodiments of computer system 1300, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86. , PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the updating methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the methods for implementing out of band component updating, are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of the methods for implementing the disclosed out of band updating as described herein, and data storage 1335, comprising various data accessible by program instructions 1325. In one embodiment, program instructions 1325 may include software elements of embodiments of the methods for implementing the disclosed out of band updating as illustrated in the above Figures. Data storage 1335 may include data that may be used in embodiments. In other embodiments, other or different software elements and data may be included.

Those skilled in the art will appreciate that computer system 1300 is merely illustrative and is not intended to limit the scope of the methods for implementing the disclosed out of band updating as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, smart phones, pad devices, tablet devices, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Accordingly, the present disclosure may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    executing an application on a processor of a computing device, the application including an update module executing to perform:
    receiving a data structure that includes information regarding a component of multiple components of the application;
    determining, from the data structure, that an updated version of the component is available;
    storing the updated version of the component in a local data store; and
    updating the component of the application with the stored updated version of the component during execution of the application and without shutting down the application.

2. The method of claim 1, wherein said updating is performed in response to an occurrence of an event in a user interface relating to the component.

3. The method of claim 2, wherein the event is defined in the data structure as part of the information regarding the component of the application.

4. The method of claim 1, further comprising the update module, prior to said updating:
    generating a prompt that the component of the application is available for substantially immediate use; and
    receiving an input to the prompt indicating to update the component.

5. The method of claim 1, wherein the data structure is received from a secure location of an operating system.

6. The method of claim 1, wherein:
    the information from the data structure regarding the component includes an indication of the updated version of the component; and
    said determining that the updated version of the component is available is based on a comparison of the indication of the updated version of the component with an indication of a loaded version of the component, the updated version being different than the loaded version.

7. The method of claim 1, wherein the component of the application is a platform-independent component usable in a first platform and in a second platform, and wherein the application is platform dependent.

8. The method of claim 1, wherein:
    said updating the component of the application includes loading the updated version of the component from a location in the local data store that is different from a location in the local data store storing a previous version of the component; and
    a time to perform said loading the updated version of the component is substantially similar to a time to perform reading the previous version of the component.

9. The method of claim 1, wherein the data structure includes a list of a location and a hash value of the component.

10. The method of claim 1, wherein the component is a plug-in implemented, at least partially, in a platform-independent scripting language.

11. The method of claim 1, wherein the updated version of the component is a single, secure compressed file.

12. The method of claim 1, wherein storing the updated version of the component in a local data store includes:
    storing the updated version of the component in a temporary data store;
    validating the stored updated version of the component; and
    storing the validated stored updated version of the component in the local data store, wherein the local data store is a user-specific local data store.

13. A non-transitory computer-readable storage medium storing program instructions, wherein the program instructions are computer-executable to implement:
    receiving a data structure that includes information regarding a component of multiple components of an application;
    determining, from the data structure, that an updated version of the component is available;
    storing the updated version of the component in a local data store; and
    updating the component with the stored updated version of the component during execution of the application and without the application shutting down, a time to perform said updating the component with the stored version of the component being substantially similar to a time to perform reading a previous version of the component.

14. The non-transitory computer-readable storage medium of claim 13, wherein said updating the component is performed in response to an occurrence of an event.

15. The non-transitory computer-readable storage medium of claim 13, werein:
    the information from the data structure regarding the component includes an indication of the updated version of the component; and
    said determining that the updated version of the component is available is based on a comparison of the indication of the updated version of the component with an indication of an loaded version of the component, the updated version being different than the loaded version.

16. The non-transitory computer-readable storage medium of claim 13, wherein the component of the application is a platform-independent component usable in a first platform and in a second platform.

17. The non-transitory computer-readable storage medium of claim 13, wherein the component is a plug-in implemented, at least partially, in a platform-independent scripting language.

18. A system, comprising:
   at least one processor; and
   a memory comprising program instructions that are executable by the at least one processor to:
   receive a data structure that includes information regarding a component of multiple components of an application;
   determine, from the data structure, that an updated version of the component is available;
   store the updated version of the component in a local data store; and
   update the component with the stored updated version of the component during execution of the application and without the application shutting down, a time to perform the update of the component with the stored version of the component being substantially similar to a time to perform reading a previous version of the component.

19. The system of claim 18, wherein the update of the component is performed in response to an occurrence of an event.

20. The system of claim 18, wherein the component is a plug-in implemented, at least partially, in a platform-independent scripting language.

* * * * *

UNITED STATES PATENT AND TRADEMARK OFFICE
CERTIFICATE OF CORRECTION

Page 1 of 1

PATENT NO. : 8,972,969 B2
APPLICATION NO. : 13/492651
DATED : March 3, 2015
INVENTOR(S) : Gaither et al.

It is certified that error appears in the above-identified patent and that said Letters Patent is hereby corrected as shown below:

In the Claims

Column 24, Line 55, after "of claim 15," delete "werein:", insert -- wherein: --, therefor.

Signed and Sealed this
Fourteenth Day of July, 2015

Michelle K. Lee
*Director of the United States Patent and Trademark Office*